United States Patent [19]

Kageyama et al.

[11] Patent Number: 4,767,830
[45] Date of Patent: Aug. 30, 1988

[54] PROCESS FOR PREPARATION OF COPOLYESTER

[75] Inventors: Yukihiko Kageyama, Fujinomiya; Toshio Nakane, Fuji; Kenji Hijikata, Mishima, all of Japan

[73] Assignee: Polyplastics Co., Ltd., Osaka, Japan

[21] Appl. No.: 99,891

[22] Filed: Sep. 22, 1987

[30] Foreign Application Priority Data

Sep. 26, 1986 [JP] Japan ................. 61-227631

[51] Int. Cl.$^4$ ............................................. C08G 63/02
[52] U.S. Cl. .................................. 525/450; 525/437; 528/272; 528/176; 528/302
[58] Field of Search ............... 525/437, 450; 528/272, 528/302, 176

[56] References Cited

U.S. PATENT DOCUMENTS

| | | | |
|---|---|---|---|
| 3,778,410 | 12/1973 | Kuhfuss et al. | 528/190 X |
| 3,975,487 | 8/1976 | Cottis et al. | 264/210.6 |
| 4,184,996 | 1/1980 | Calundann | 524/605 |
| 4,621,126 | 11/1986 | Yoshimura et al. | 528/176 |

Primary Examiner—Lucille M. Phynes
Attorney, Agent, or Firm—Birch, Stewart, Kolasch & Birch

[57] ABSTRACT

The invention process comprises reacting a polyester with a hydroxy-aromatic carboxylic ester to effect the transesterification and then further polymerizing the product. The process is conducted so that the obtained product has a high molecular weight and does not contain impurities, without corrosion of a used reactor.

8 Claims, No Drawings

PROCESS FOR PREPARATION OF COPOLYESTER

The present invention relates to a process for preparing industrially advantageously a copolyester which shows anisotropy when molten.

A liquid crystal polymer which shows anisotropy when molten has recently attracted attention as a polyester having high strength and high heat resistance and being excellent in the moldability.

As means for imparting anisotropy in a molten state, there is adopted a method in which a monomer manifesting a rigidity, which is called "mesogen", is combined with a monomer manifesting a softness, which is called "soft spacer". Typical instances of this method are disclosed in Japanese Patent Application Laid-Open Specification Nos. 72393/1974, 43223/1975 and 50594/1979.

Of these known methods, the method of W. J. Jackson et al. in which a polyalkylene terephthalate, which is a known crystalline polymer, is reacted with acetoxylated hydroxybenzoic acid to obtain a liquid-crystal polymer (Japanese Patent Application Laid-Open Specification No. 72393/1974) is industrially advantageous as simple means for introduction of the mesogen.

In the above-mentioned method, however, since the acetoxylated hydroxybenzoic acid is used as the mesogen, a homopolymer of the hydroxybenzoic acid is readily formed, and when the product is formed into a film, fiber or the like, this homopolymer is left as an infusible substance and forms defects in the film or fiber. product has a high molecular weight and does not contain impurities, without corrosion of a used reactor.

More specifically, in accordance with the present invention, there is provided a process for the preparation of a copolyester which shows anisotropy when molten, which is characterized by reacting a polyester having as the main recurring units dicarboxylic acid-diol units represented by the following general formula (A):

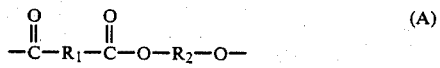

wherein $R_1$ stands for an aromatic divalent radical having 6 to 20 carbon atoms or an aliphatic divalent radical having 4 to 20 carbon atoms, and $R_2$ stands for at least one radical selected from the group consisting of aromatic divalent radicals having 6 to 20 carbon atoms and aliphatic divalent radicals having 2 to 20 carbon atoms, with at least one hydroxy carboxylic acid ester represented by the following general formula (B):

wherein $R_3$ stands for an aliphatic hydrocarbon, aromatic hydrocarbon or hydroxy-substituted aliphatic Furthermore, in the transesterification, an increase in the degree of polymerization is difficult because of random reactivity of the polyalkylene terephthalate. Moreover, since this method includes the step of removing acetic acid under heating, corrosion of a reaction vessel and pipes is extreme, and use of a special material such as Hastelloy and processing of the material become necessary, resulting in an increase in the cost of the preparation apparatus.

We have made research with a view to developing a process for preparing industrially advantageously a high-quality liquid-crystal polymer showing anisotropy when molten with reduced corrosion while controlling formation of an infusible substance. As the result, we have found that a specific hydroxybenzoic acid ester is effective in forming a copolymer meeting the object of the present invention. We have now completed the present invention based on this finding.

The invention process comprises reacting a polyester with a hydroxy-aromatic carboxylic ester to effect the transesterification and then further polymerizing the product. The process is conducted so that the obtained hydrocarbon radical having 2 to 20 carbon atoms, $R_4$ stands for a hydrogen atom, a halogen atom or an aliphatic hydrocarbon or alkoxyl radical having 1 to 4 carbon atoms, and X stands for a radical of a compound having at least one aromatic ring having 5 to 20 carbon atoms, and subjecting the obtained transesterification product to polymerization to obtain a high polymer.

In the present invention, since acetic acid as the acylating agent is not used, there is no risk of corrosion of a vessel under heating and formation of a homopolymer is controlled. Accordingly, an insoluble and infusible substance is hardly formed. Moreover, to our surprise, the degree of polymerization is unexpectedly increased in the obtained copolyester.

The polyester having the dicarboxylic acid-diol units as the main units, which is used in the present invention, includes polyesters customarily used in the production of copolyesters showing anisotropy when molten, such as polyethylene terephthalate and polybutylene terephthalate, and copolyesters composed mainly thereof. More specifically, polyesters represented by the general formula (A) can be used.

The general formula (A) will now be described in detail. Namely, $R_1$ is at least one group selected from among aromatic compounds such as phenylene, naphthylene, biphenylene, 1,1-alkylenebiphenylene and substituted derivatives thereof and/or linear, branched and cyclic aliphatic hydrocarbons having carbon numbers of 4, 5, 6, 7, 8, 16, 17 and 18. Aromatic compounds such as phenylene, naphthylene and biphenylene are preferred, and phenylene is especially preferred.

As specific examples of $R_2$, there can be mentioned aromatic compounds such as phenylene, naphthylene, biphenylene 1,1'-alkylenebiphenylene and substituted derivatives thereof and/or linear, branched and cyclic aliphatic hydrocarbons having 2 to 8 carbon atoms, and $R_2$ is at least one group selected from these compounds. Phenylene, 1,1'-alkylenephenylene and alkylene groups having 2 to 4 carbon atoms are preferred, and an alkylene group having 2 to 4 carbon atoms is especially preferred.

As preferred examples of the combination of $R_1$ and $R_2$, there can be mentioned a polyarylate in which $R_1$ is phenylene and $R_2$ is 1,1'-alkylenephenylene, polyethylene terephthalate in which $R_1$ is phenylene and $R_2$ is ethylene, and polybutylene terephthalate in which $R_1$ is phenylene and $R_2$ is butylene, among which polyethylene terephthalate and polybutylene terephthalate are especially preferred. The degree of polymerization of the polyester (A) as the starting material is not particularly critical, but in view of the reaction easiness, an oligomer and a polymer having a low degree of polymerization are preferred. A preferred intrinsic viscosity is from 0.3 to 0.7. The polyester may contain, in addition to the ester linkage units, other linkage units such as amide, imide or ether linkage units. However, in view of the reactivity with the hydroxy carboxylic acid ester represented by the general formula (B), it is preferred that the content of linkage units other than the ester linkage units be up to 30 mole % in the polyester (A).

In the hydroxy carboxylic acid ester represented by the general formula (B), $R_4$ stands for a hydrogen atom, a halogen atom or an aliphatic hydrocarbon or alkoxyl radical having 1 to 4 carbon atoms. A hydrogen atom, a halogen atom and an aliphatic hydrocarbon having one carbon atom are preferred, and a hydrogen atom is especially preferred. $R_3$ stands for an aliphatic hydrocarbon, aromatic hydrocarbon or hydroxy-substituted aliphatic hydrocarbon radical having 2 to 20 carbon atoms. An aliphatic hydrocarbon radical having 2 to 6 carbon atoms, an aromatic hydrocarbon radical having 6 carbon atoms and a hydroxy-substituted aliphatic hydrocarbon radical having 2 to 4 carbon atoms are preferred. X stands for a radical of a compound having at least one aromatic ring having 5 to 20 carbon atoms and, for example, X is at least one radical of a compound selected from among p-phenylene, 4,4'-biphenylene, 4,4'-alkylenebiphenylene and 2,6-naphthalene. A p-phenylene radical and/or a 2,6-naphthalene radical is preferred.

Preferred examples of the hydroxy carboxylic acid ester consisting of the combination of $R_3$, $R_4$ and X are butyl, phenyl, alkyl-substituted phenyl, hydroxyethyl and hydroxybutyl esters of hydroxybenzoic acid and ethyl, butyl, phenyl, alkyl-substituted phenyl, hydroxyethyl and hydroxybutyl esters of hydroxynaphthoic acid.

The composition ratio (molar ratio) of the hydroxy aromatic carboxylic acid ester to the polyester is from 5/95 to 95/5, preferably from 20/80 to 80/20, especially preferably from 50/50 to 70/30.

The preparation process of the present invention comprises the first step of conducting transesterification between the polyester and the hydroxy aromatic carboxylic acid ester and the second step of increasing the degree of polymerization. In the first step, the polyester (including an oligomer) and the hydroxy aromatic carboxylic acid ester are heated at 150° to 350° C., preferably 200° to 300° C., under atmospheric pressure in a reaction vessel.

In the second step, the temperature of the reaction system is elevated to distill off the hydroxy compound eliminated from the hydroxy aromatic carboxylic acid ester from the reaction system, and then the pressure is gradually reduced to completely remove a residual hydroxy compound. Thus, the polymerization is completed.

It is preferred that in the second step the degree of polymerization be increased to such an extent that the inherent viscosity of the copolyester is at least 0.4. In general, the inherent viscosity is a factor indicating the degree of polymerization of a polymer. If the inherent viscosity of the polymer is lower than 0.4, the moldability, mechanical strength and chemical resistance of the polymer per se are poor, and a copolyester having excellent mechanical characteristics cannot be obtained. However, even if the inherent viscosity is lower than 0.4, the copolyester may be used after modification as the oligomer acting as a compatibilizing agent or polymer modifier.

In carrying out the present invention, the reaction can be efficiently advanced by using catalysts.

As the catalyst for the first step, there can be mentioned tin compounds (such as dibutyltin oxide and stannous acetate) and antimony compounds (such as antimony trioxide), and as the catalyst for the second step, there can be mentioned titanium compounds (such as potassium titanate) and zinc compounds (such as zinc acetate). These compounds can be used singly or in the form of a mixture of two or more of them. The amount of the catalyst added is 50 to 5,000 ppm, preferably 200 to 2,000 ppm, based on the formed polymer. (Effect of the Invention)

The copolyester obtained according to the present invention has a high degree of polymerization because acidolysis by an acetoxy group is not substantially caused. Accordingly, the strength is high, and even if the copolyester is formed into a film or the like, the amount of an infusible substance is very small and acid recovery in a hot state is not necessary. Therefore, an inexpensive apparatus can be used in industrial manufacture and the process of the present invention is excellent as means for obtaining a liquid-crystal polyester showing anisotropy when molten.

(EXAMPLES)

The present invention will now be described in detail with reference to the following examples that by no means limit the scope of the present invention.

The properties were determined and evaluated according to the following methods.

Intrinsic Viscosity

The intrinsic viscosity is the logarithmic viscosity number determined with respect to a 0.1% by weight solution in pentachloriphenol at 60° C.

Melt Anisotropy

The anisotropy in a molten state is determined based on permeation through cross polarizers on a hot stage in a nitrogen atmosphere.

Tensile Strength

A test piece is prepared from the obtained polymer by using an injection molding machine, and the tensile strength is measured according to ASTM D-638.

Concentration of Infusible Substance

The polymer is dissolved in pentachlorophenol at 60° C. at a concentration of 0.1% by weight, the solution is filtered while it is hot, and the amount of the insoluble substance is measured.

EXAMPLE 1

A reaction vessel equipped with a stirrer, a nitrogen inlet tube and a distillation tube was charged with 1024 parts by weight of polybutylene terephthalate having an inherent viscosity of 0.60, 1284 parts by weight of phenyl p-hydroxybenzoate and 0.5 part by weight of dibutyltin oxide as the catalyst and the mixture was heated at 250° C. in a nitrogen current. The temperature was elevated to 275° C. over a period of 1 hour and the mixture was violently stirred for 1 hour. Introduction of nitrogen was stopped and the pressure in the reaction vessel was gradually reduced to 0.4 mmHg over a period of 30 minutes. The mixture was stirred for additional 5 hours.

The obtained polymer showed anisotropy when molten, and the inherent viscosity was 1.2, the tensile strength was 940 kg/cm$^2$ and the insoluble substance content was 0.019% by weight.

EXAMPLE 2

A reaction vessel equipped with a stirrer, a nitrogen inlet tube and a distillation tube was charged with 1024 parts by weight of polybutylene terephthalate having an inherent viscosity of 0.60 and 1260 parts by weight of butyl p-hydroxybenzoate, and the mixture was heated at 250° C. in a nitrogen current. The temperature was elevated to 275° C. over a period of 1 hour and the mixture was violently stirred for 1 hour. Then, introduction of nitrogen was stopped and the pressure in the reaction vessel was gradually reduced to 0.4 mmHg over a period of 30 minutes. The mixture was further stirred for 5 hours.

The obtained polymer showed anisotropy when molten, and the inherent viscosity was 1.9, the tensile strength was 1200 kg/cm$^2$ and the insoluble substance content was 0.17% by weight.

EXAMPLE 3

A reaction vessel equipped with a stirrer, a nitrogen inlet tube and a distillation tube was charged with 1024 parts by weight of polybutylene terephthalate having an inherent viscosity of 0.60 and 1584 parts by weight of phenyl 2-hydroxy-6-naphthoate, and the mixture was heated at 250° C. in a nitrogen current. The temperature was elevated to 275° C. over a period of 1 hour and the mixture was violently stirred for 1 hour. Then, introduction of nitrogen was stopped and the pressure in the reaction vessel was gradually reduced to 0.4 mmHg over a period of 30 minutes. The mixture was stirred for additional 5 hours.

The obtained polymer showed anisotropy when molten, and the inherent viscosity was 1.4, the tensile strength was 950 kg/cm$^2$ and the insoluble substance content was 0.17% by weight.

EXAMPLE 4

A reaction vessel equipped with a stirrer, a nitrogen inlet tube and a distillation tube was charged with 1024 parts by weight of polybutylene terephthalate having an inherent viscosity of 0.60, 856 parts by weight of phenyl p-hydroxybenzoate and 528 parts by weight of phenyl 2-hydroxy-6-naphthoate, and the mixture was heated at 250° C. in a nitrogen current. The temperature was elevated to 275° C. over a period of 1 hour and the mixture was violently stirred for 1 hour. Then, introduction of nitrogen was stopped and the pressure in the reaction vessel was gradually reduced to 0.4 mmHg over a period of 30 minutes. The mixture was further stirred for 5 hours.

The obtained polymer showed anisotropy when molten, and the inherent viscosity of the polymer was 1.6, the tensile strength was 1240 kg/cm$^2$ and the insoluble substance content was 0.18% by weight.

EXAMPLE 5

A reaction vessel equipped with a stirrer, a nitrogen inlet tube and a distillation tube was charged with 768 parts by parts of polyethylene terephthalate having an inherent viscosity of 0.62 and 1284 parts by weight of phenyl p-hydroxybenzoate, and the mixture was heated at 250° C. in a nitrogen current. The temperature was elevated to 275° C. over a period of 1 hour and the mixture was violently stirred for 1 hour. Then, introduction of nitrogen was stopped and the pressure in the reaction vessel was gradually reduced to 0.4 mmHg over a period of 30 minutes. The mixture was further stirred for 5 hours.

The obtained polymer showed anisotropy when molten, and the inherent viscosity of the polymer was 0.80, the tensile strength was 1250 kg/cm$^2$ and the insoluble substance content was 0.19% by weight.

EXAMPLE 6

A reaction vessel equipped with a stirrer, a nitrogen inlet tube and a distillation tube was charged with 768 parts by weight of polyethylene terephthalate having an inherent viscosity of 0.62 and 1092 parts by weight of hydroxyethyl p-hydrobenzoate, and the mixture was heated at 250° C. in a nitrogen current. The temperature was elevated to 275° C. over a period of 1 hour and the mixture was violently stirred for 1 hour. Then, introduction of nitrogen was stopped and the pressure in the reaction vessel was gradually reduced to 0.4 mmHg over a period of 30 minutes. The mixture was stirred for additional 5 hours.

The obtained polymer showed anisotropy when molten, and the inherent viscosity of the polymer was 0.84, the tensile strength was 1270 kg/cm$^2$ and the insoluble substance content was 0.16% by weight.

COMPARATIVE EXAMPLE 1

A reaction vessel equipped with a stirrer, a nitrogen inlet tube and a distillation tube was charged with 1024 parts by weight of polybutylene terephthalate and 1080 parts by weight of p-acetoxybenzoic acid, and the mixture was heated at 250° C. in a nitrogen current. The temperature was elevated to 275° C. over a period of 1 hour and the mixture was violently stirred for 1 hour. Then, introduction of nitrogen was stopped and the pressure in the reaction vessel was gradually reduced to 0.4 mmHg over a period of 30 minutes. The mixture was further stirred for 5 hours.

The obtained polymer showed anisotropy when molten, and the inherent viscosity of the polymer was 0.64, the tensile strength was 850 kg/cm$^2$ and the insoluble substance content was 0.30% by weight.

COMPARATIVE EXAMPLE 2

A reaction vessel equipped with a stirrer, a nitrogen inlet tube and a distillation tube was charged with 768 parts by weight of polyethylene terephthalate having an inherent viscosity of 0.62 and 1080 parts by weight of p-acetoxybenzoic acid, and the mixture was heated at 250° C. in a nitrogen current. The temperature was elevated to 275° C. over a period of 1 hour and the mixture was violently stirred for 1 hour. Then, introduction of nitrogen was stopped and the pressure in the reaction vessel was gradually reduced to 0.4 mmHg over a period of 30 minutes. The mixture was stirred for additional 5 hours.

The obtained polymer showed anisotropy when molten, and the inherent viscosity of the polymer was 0.65, the tensile strength was 1100 kg/cm$^2$ and the insoluble substance content was 0.31% by weight.

What is claimed is:

1. A process for the preparation of a coplyester which shows anisotropy when molten, characterized by reacting a polyester having as the main recurring units dicarboxylic acid-diol units represented by the following general formula (A):

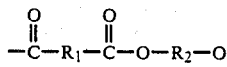

wherein $R_1$ stands for an aromatic divalent radical having 6 to 20 carbon atoms or an aliphatic divalent radical having 4 to 20 carbon atoms, and $R_2$ stands for at least one radical selected from the group consisting of aromatic divalent radicals having 6 to 20 carbon atoms and aliphatic divalent radicals having 2 to 20 carbon atoms. with at least one hydroxy carboxylic acid ester represented by the following general formula (B):

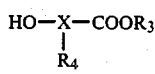

wherein $R_3$ stands for an aliphatic hydrocarbon, aromatic hydrocarbon or hydroxy-substituted aliphatic hydrocarbon radical having 2 to 20 carbon atoms, $R_4$ stands for a hydrogen atom, a halogen atom or an aliphatic hydrocarbon or alkoxyl radical having 1 to 4 carbon atoms, and X stands for a radical of a compound having at least one aromatic ring having 5 to 20 carbon atoms, and subjecting the obtained transesterification product to polymerization to obtain a high polymer.

2. A preparation process according to claim 1, wherein the hydroxy carboxylic acid ester represented by the general formula (B) is a compound in which X in the general formula (B) is at least one member selected from the group consisting of p-phenylene, 4,4'-biphenylene, 4,4'-alkylenebiphenylene and 2,6-naphthalene.

3. A preparation process according to claim 1, wherein the hydroxy carboxylic acid ester represented by the general formula (B) is a compound in which X in the general formula (B) is p-phenylene and/or 2,6-naphthalene.

4. A preparation process according to claim 1, wherein the hydroxy carboxylic acid ester represented by the general formula (B) is a compound in which $R^3$ in the general formula (B) is selected from the group consisting of aromatic hydrocarbon radicals having 6 to 10 carbon atoms and aliphatic hydrocarbon and hydroxy-substituted aliphatic hydrocarbon radicals having 2 to 10 carbon atoms.

5. A preparation process according to claim 2, wherein $R_3$ of the hydroxy carboxylic acid ester represented by the general formula (B) is selected from the group consisting of a phenyl group, a naphthyl group, an ethyl group, a propyl group, a butyl group, a pentyl group, a hexyl group, a hydroxyethyl group, a hydroxypropyl group, a hydroxybutyl group, a hydroxypentyl group, a hydroxyhexyl group and a hydroxycyclohexyl group.

6. A preparation process according to claim 2, wherein $R_3$ of the hydroxy carboxylic acid ester represented by the general formula (B) is selected from the group consisting of a phenyl group, an ethyl group, a butyl group, a hydroxyethyl group and a hydroxybutyl group.

7. A preparation process according to claim 1, wherein $R_1$ of the polyester represented by the general formula (A) is mainly phenylene and $R_2$ is an aliphatic divalent radical having 2 to 8 carbon atoms.

8. A preparation process according to claim 1, wherein the polyester represented by the general formula (A) is mainly polyethylene terephthalate or polybutylene terephthalate.

* * * * *